March 25, 1969          J. B. HUFF          3,434,850

PROCESS FOR PRESERVING FISH BY IRRADIATION

Filed July 29, 1966          Sheet 1 of 3

INVENTOR
JOHN B. HUFF
BY Ernest S. Cohen
ATTORNEY

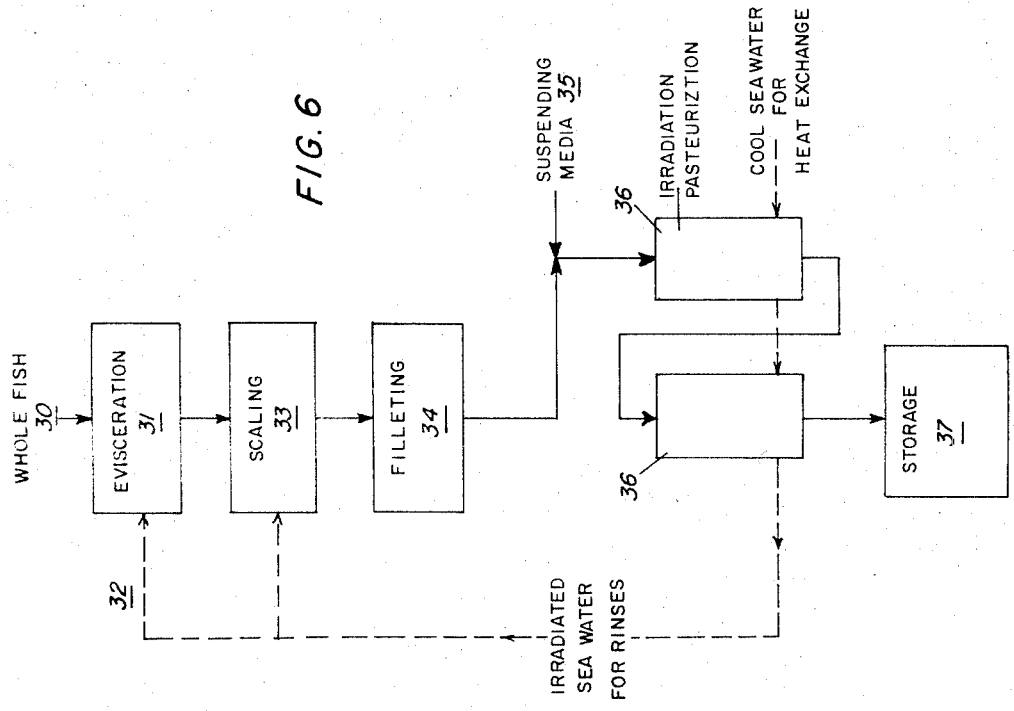
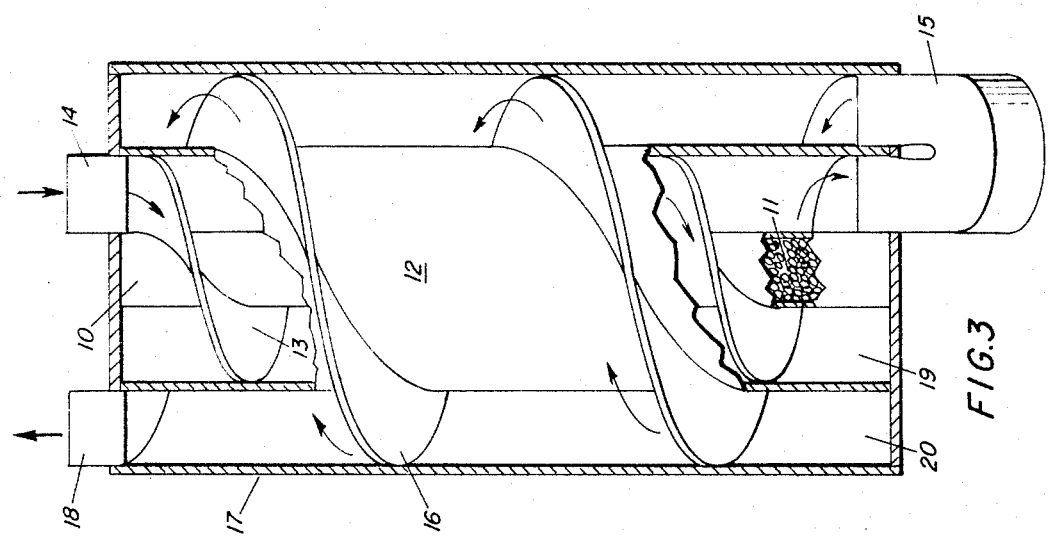

United States Patent Office 3,434,850
Patented Mar. 25, 1969

3,434,850
PROCESS FOR PRESERVING FISH BY IRRADIATION
John B. Huff, Rockport, Mass., assignor to the United States of America as represented by the Secretary of the Interior
Filed July 29, 1966, Ser. No. 568,980
Int. Cl. A23l *3/26;* G01n *21/26*
U.S. Cl. 99—217                              5 Claims

ABSTRACT OF THE DISCLOSURE

This invention relates to an apparatus and method for irradiating solids, fluids, or solids suspended in fluids by passing the material in a helical path around a cylindrical source.

The system finds particular utility in the irradiation pasteurization of bulk foods. An example of the invention is illustrated by the passage of a gel-like semisolid mixture of filleted fish suspended in agar through a helical path around a cylindrical source. The use of multistage and multipass irradiators is suggested to assure uniform dosages of such semisolid materials.

Background of invention

Radiation finds utility in a variety of industrial environments. Its use is becoming more widespread in the areas of catalysis, polymerization, cracking, and most importantly, food pasteurization. A major concern in these processes is the efficiency of source utilization, because to date, commonly used sources such as cobalt 60 comprise a major process expense. Other design considerations are the compactness of the equipment and the uniformity of dosage given the material being treated.

Of the areas of utility mentioned, the one showing the greatest promise in the near future is the treatment of foods by irradiation.

Food pasteurization by irradiation has recently been extensively studied as a solution to the age old problem of perishable foods. Through the use of irradiation, perishable food shelf life may be greatly extended thereby allowing increased efficiency in transportation and storage and making available to a greater number of consumers a greater variety of food products. In the processing of foodstuffs by irradiation, the prior art has generally followed one of two methods.

The first method involves sterilizing the food by passing therethrough a beam of high energy electrons. The ionizing irradiation of the high energy electron beam is powerful to the extent that complete sterilization of food can be obtained. An application of this method can be found in U.S. Patent 2,858,441 to Gale. Although complete sterilization is possible using electron beams, the massive doses of radiation from high energy electrons frequently causes undesirable changes in the textures, colors and tastes of foodstuffs.

Consequently more attention has been given to the second method which involves irradiation pasteurization. This process comprises the radiation of a foodstuff with a radioactive source at dosages below that required for complete sterilization. With gamma radiation from a radio-active source, it is easier to control and inhibit changes in texture, color, and taste than is possible when using the ionized radiation of a high energy electron beam. Using irradiation pasteurization it is possible to increase the marketing possibilities of foods which because of their perishable nature, are sold only within specific localities or if marketed outside those areas, sold only at very high prices. Irradiation pasteurization is particularly useful in the processing of fish, which is notorious for its perishable qualities.

Well known in the art of irradiation pasteurization, is the need for systems which occupy small floor areas and yet at the same time exhibit a high degree of radiation efficiency with a uniformity of dosage. A previous attempt to achieve these results is described in U.S. Patent 3,192,-054 to Kuhl et al. That patent describes a process which improved the state of the art by providing a method of controlled irradiation wherein radioactive source plates are moved up and down between individual food packages arranged in a continuously moving row. Such a system offers reasonably good dose control operating at a maximum/minimum dose ratio of 1.3. Relative to prior systems, the parallel source plate arrangement also has a high production capacity as about 20–25% of the source energy is absorbed by the product. However, for irradiation pasteurization to become competitive with other methods of food processing it is necessary to design systems having even greater efficiency than heretofore obtainable.

Objects of invention

Accordingly, the objects of the present invention are to provide:

An improved irradiation apparatus;

An improved apparatus for the irradiation of fluent solids, liquids, and semisolid suspensions;

An apparatus for the irradiation pasteurization of fish products;

A method for the irradiation of fluent materials;

A method for the irradiation of food products; and

An improved method for the irradiation pasteurization of fish products.

Description of invention

Still other objects of the invention will become evident from the following description of a preferred embodiment of the invention and the accompanying drawings wherein:

FIG. 3 is an elevational view partly in cross-section of a multipass irradiator according to the present invention.

FIG. 6 is a schematic diagram of a preferred process for the irradiation pasteurization of fish.

Briefly, the present invention comprises an apparatus and method for the irradiation of fluent materials wherein the material is caused to flow in a helical path around a cylindrical source. It has been found that such a system give rise to a more efficient source utilization and provides a system which is particularly applicable to the irradiation pasteurization of perishable foods such as fish. The apparatus will be described in more detail by a consideration of FIGS. 1–5.

Figure 1:
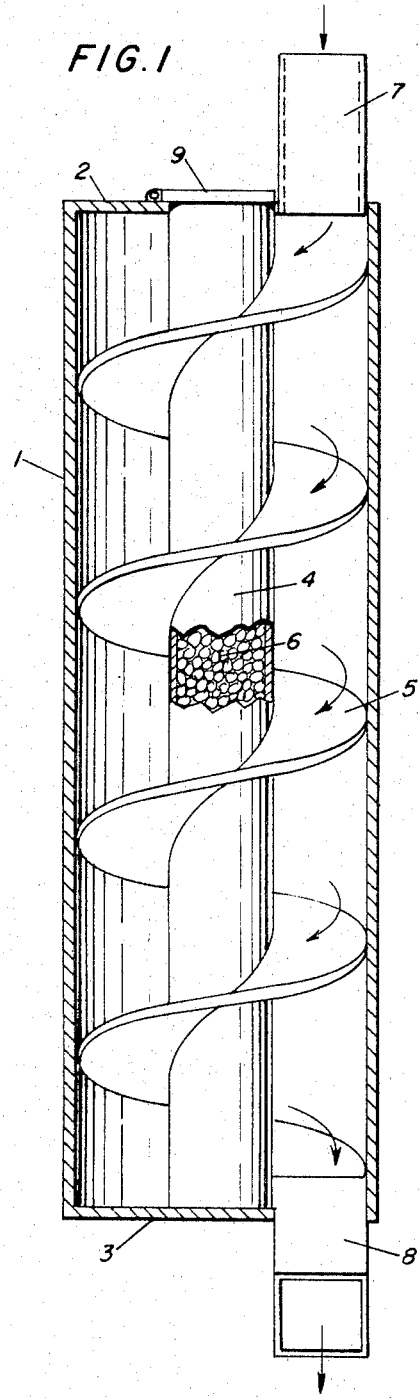
FIG. 1 is an elevational view partly in cross-section of an irradiation apparatus according to the present invention.

FIG. 1 represents an elevational view partly in cross-section of an irradiator. In that figure, 1 represents an outer cylindrical casing having end portions 2 and 3. Located concentrically with outer cylinder 1 is an inner hollow cylinder 4 which may be welded or brazed to inner cylinder 4 and outer cylinder 1 in such a manner that a helical path is formed by the intersection of the winding 5 and cylinders 1 and 4. Chutes 7 and 8 are attached to ends 2 and 3 respectively so that they communicate with the helical path. Within inner cylinder 4 there is positioned a radioactive source material six.

Figure 2:
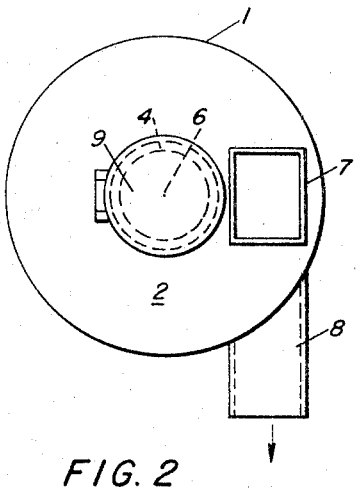
FIG. 2 is a top view of the apparatus shown in FIG. 1.

As shown in FIG. 1, the source material fills cylinder 4. Preferably, the source is pellets or balls of cobalt 60 or a cesium 137 salt although a rod of cobalt 60 may also be used. Alternately, a can containing pellets of a cesium 137 salt can be used. The source assembly may be dropped into place through an opening in end plate 2. A cover 9 may be used to cap the opening after the source material has been received. FIG. 2 shows the top view of the irradiator, wherein 1 is the outer cylinder, 4 is the inner cylinder, 6 is the source rod, 7 is the input chute, 8 is the output chute, and 9 is the cover for the inner cylinder. In operation, the material to be irradiated is charged by gravity or forced flow through chute 7 and flows in a helical path described by the helical winding 7, and leaves the irradiator via chute 8.

Source 6 is preferably a cobalt 60 source, the strength of which is not a design limitation because sources from 1 to 1 million curies are obtainable. The radius of the helical path will be influenced by considerations such as percent utilization of the source and the maximum/minimum dosage ratio. As will be appreciated, a larger radius will enable a higher percent utilization of the source as more radiation will be absorbed in the product and less will pass through unabsorbed. At the same time, it will also be true that with a larger radius apparatus the ratio of maximum radiation to minimum radiation within the helical path will be greater than in a smaller radius apparatus. Therefore when designing the radius of the apparatus, efficiency of source utilization must be balanced with uniformity of dosage. The helical winding 5 may vary in slope depending upon whether the material is being pumped through the apparatus, or whether the flow is dependent upon gravity. This basic unit can be fabricated a number of ways. For example, tube 4 can be first welded to helix 5, which can then be machined to fit into outer tube 1. Helix 5 may be soldered with tin or silver solder to outer tube 1. End pieces 2, 3, 7, and 8 may then be welded or soldered on. The important consideration is that the inside of the apparatus be smooth and free of crevices. Source 6 may be dropped into place within tube 4 from a shipping cask by opening cap 9 which serves as a cover for tube 4.

The apparatus and method of the present invention have a number of advantages over prior irradiators. Chief among them is the increase in source utilization that is possible. If, for example, a cobalt 60 helical irradiator of the type previously described is constructed so that the helical path is 15 inches in width the amount of radiation absorbed by the product can be calculated as follows:

The intensity I of an incident broad beam to passing through a slab of thickness $x$ is given by the following formula:

$$I = bI_0 e^{-ux}$$

where $b$ is the buildup factor
$e$ is the natural logarithm base
$u$ is the attenuation factor for the absorbing medium.
$x = 15$ inches $= 38$ cm.
$u = 0.064$ for a ray energy of 1.25 mev. gamma (Radiological Health Handbook, Office of Technical Services, U.S. Department of Commerce, Washington, D.C., p. 145)
$b = 4$ (Radiological Health Handbook, p. 150), therefore, $I = 4 I_0 e^{-2.44}$
$I = 4 I_0 (0.087)$
$I = 0.35 I_0$.

Thus it can be seen that 35% of a plane, monodirectional cobalt 60 beam passes through; 65% is absorbed by a 15 inch slab of water. Comparable behavior will be exhibited by a 36 inch diameter helical irradiator having a 6 inch diameter center tube. A 65% source utilization is roughly 2 to 3 times the amount obtained by prior art devices. It should be noted that the present device takes up much less floor space than conventional irradiators using a series of vertical plates spaced in a horizontal row. It is expected that these advantages will make possible the incorporation of irradiation in environments which heretofore were unable to afford the cost and space required to use prior art equipment.

As previously mentioned, another important consideration in irradiator design is uniformity of dosage. The measures taken to assure uniform treatment in the apparatus of the present invention will depend upon the nature of the material undergoing treatment. For example, if the material is a small grained solid such as catalytic pellets or beads uniform dosage can be achieved by creating turbulence within path of flow of material. This can be done either by agitation as for example by vibration, or by the placement of baffles within the helical path to create a tortuous flow and to enhance mixing. If the material being treated is a liquid, a proper mixing of the liquid stream will assure uniform dosage. Again, mixing may be accomplished through the use of baffles or other flow diverting means within the helical path. If the material being treated is a gel or semisolid suspension such as agar which is not amenable to mixing, a different sort of problem is presented. When working with material of this type, it is desirable to use a multipass or multistage treatment wherein the portion of the semisolid material which is nearest to the source in the first pass or stage is then the furthest from the source in the next pass or stage. This technique will be more fully explained with references to FIGS. 3 thru 5.

FIG. 3 is an elevational view partly in cross-section of a multipass irradiator. In this figure, 10 is an inner hollow cylinder containing source 11. Concentric with inner cylinder 10 is an intermediate cylindrical shell 12. A helical winding 13 is positioned around inner cylinder 10 and intersects both inner cylinder 10 and intermediate cylinder 11. An input chute 14 is in communication with the helical path formed by helical winding 13. A chute 15 is in communication with the opposite end of the helical path and serves to accept material from the helical path. However, unlike the apparatus described in FIG. 1, discharge chute 15 is brought into communication with a second helical path formed by a second helical winding 16 which is wound around cylinder 12 and which forms a helical path between intermediate cylinder 12 and an outer cylinder 17. Normally, the distance between the flights of the two windings would be the same, however for illustrative purposes the distance as shown in FIG. 3 is larger for the external winding. Chute 18 is a final product discharge from the outer helical path.

Using this type of multipass irradiator, it is possible to achieve a uniform dosage within semisolid material. In operation, the material is force fed to the irradiator via chute 14 and travels downwardly along helical winding 13. At the end of this pass it enters chute 15 where it is channeled to enter an outer helical path. The paths are arranged so that the portion of the material being treated which is closest to the source during the first pass, is furthest from the source during the pass through the second helical path. Adjustments can be made in width 19 of the inner path and 20 of the outer path so that acceptable maximum/minimum dosages may be obtained. Alternatively, additional outer helical paths may be formed and the material passed through in a predetermined direction.

Figure 4:
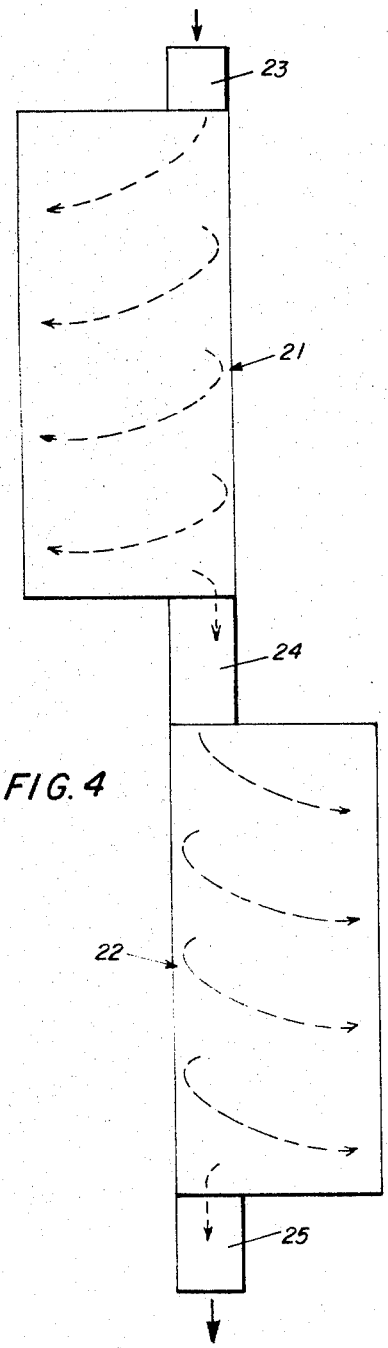
FIG. 4 is a schematic elevational view of a multistage irradiator system in accordance with the present invention.
Figure 5:
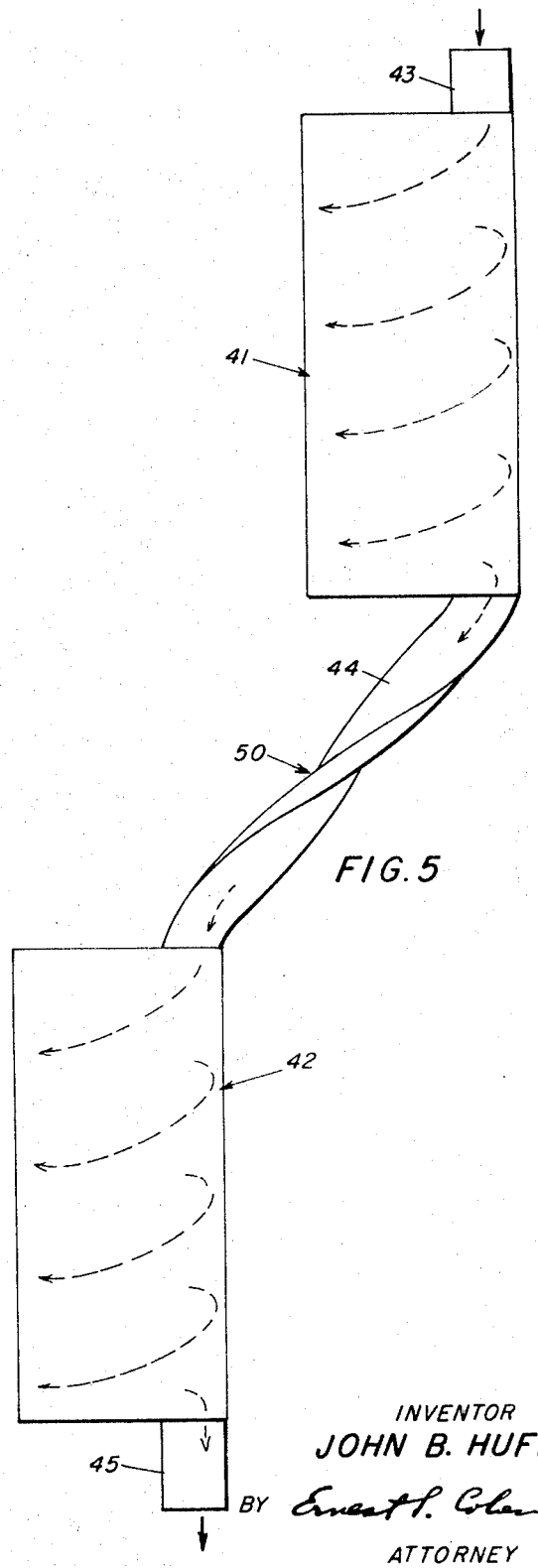
FIG. 5 is a schematic elevational view of a multistage irradiation system having a twisted connecting member.

Another solution to the problem lies in the use of a multistage irradiation, such as shown in FIG. 4. In that figure, 21 and 22 are helical irradiators of the type shown in FIG. 1. Feed material enters through chute 23 and passes downwardly through the first irradiator in a clockwise manner and exits into chute 24 which carries the material to a second irradiator where the material passes downwardly in a counterclockwise manner and discharges through chute 25. In this system as in the multipass system, the portion of the material closest to the source in the first helical path is furthest from the source in the second helical path. This is accomplished simply by making the direction in one stage clockwise and the other stage counterclockwise. The flow may be downwards or upwards in either of the stages as long as one stage is clockwise and the other is counterclockwise. Still another alternative arrangement consists in having the product flow through both helical paths in the same direction, i.e., clockwise or counterclockwise but twisting the chute connecting the two irradiators through 180° so that the top of the discharge from the first irradiator becomes the bottom of the input to the second irradiator. Such a system is shown in FIG. 5 wherein 41 and 42 are helical irradiators of similar construction. Semisolid material is pumped into the first irradiator via chute 43. It leaves the first irradiator via chute 44 which is twisted 180° about its axis at 50. The result of this twist in chute 44 is that the material delivered to the second irradiator 42 will be rotated 180° about its longitudinal axis. The portion of the material which was on the top on the pass through irradiator 41 will be on the bottom through irradiator 42 and the portion which was closest to the source in 41 will be furthest from the source in 42. After treatment in irradiator, the material exits via 45 which carries the treated material to a further treament or to a storage.

Method

As previously mentioned, the apparatus of the present invention will find utility in a variety of environments, however, a particularly useful application is in the irradiation pasteurization of foods. As a specific example, it is now possible using the instant apparatus to effect a more efficient pasteurization of fish products by use of a novel method.

While the irradiation pasteurization of fish is known in the prior art as shown by Kuhl et al. in U.S. Patent 3,192,054, the fish have always been delivered whole from the fishing boats to large land installations where they were pasteurized by irradiation. By use of the present method it is possible to eliminate the need for fishing vessels to interrupt fishing activities to deliver their catch to a land installation. Using the novel apparatus of this invention it is proposed to pasteurize the fish at sea. Briefly, a preferred method comprises eviscerating, scaling and filleting the fish aboard ship, adding to the fillets a suspending medium, as will be further described in greater detail, to create a suspension in which the fish are precluded from movement but which exhibits fluent properties enabling it to be pumped, passing the suspension through a helical irradiator and then to a refrigerated storage zone which may be aboard the same or a different vessel.

The method will be more fully understood when reference is made to FIGURE 6 where there is illustrated a flow diagram of a specific fish pasteurization process in accordance with the present invention. In that diagram, whole fish 30 are passed to an evisceration zone 31 where the entrails, fins, slime, backbones and tails are removed. As an optional addition, the fish may be washed at this point with irradiated sea water 32. After eviscerating, the fish are scaled 33 and filleted 34. After they have been filleted, the fish are put into suspension by treatment with a suspending media 35. Solutions of starch, gelatin or agar may be used as the suspending media. It is desirable to use as little of the suspending media as possible, only using enough to cover the loosely packed fish and to keep them from moving within the suspension Solutions of agar are the preferred suspending media and they have been found successful when used from about 20% to 40% by weight of the total mixture, depending upon the product being suspended. Satisfactory agar solutions may be prepared using as little as 0.2% agar in water. After the fish have been placed in suspension, the gel-like mixture is passed through a helical irradiation, such as the multistage system 36 shown in FIG. 5.

The dose rate required to pasteurize marine products varies from 75,000 to 350,000 rads. The fish may be given an appropriate dosage by varying the strength of the source, the length and radius of the helical path, and the flow rate. It is desirable although not essential to refrigerate the semisolid mixture to about 34–40° F. before irradiation. After pasteurization the mixture is pumped through a tube or hose to a refrigerated storage vessel 37. This vessel may be on the same or a different ship. Various types of pumping arrangements may be used to transport the mixture to and from the irradiator, however, a preferred system is the dual cylinder hydraulic type in which the discharge is continuous. A pump of nature is illustrated in Food Processing, vol. 25, No. 3, p. 80 (March 1964).

A great number of advantages are gained by use of the present method. Fishing ships may remain in the fishing area and spend all their time engaged in catching fish. Ships having the eviscerating, filleting and irradiation equipment can travel to the fishing ships and whole fish can be pumped as a water slurry to the irradiator ship. The treated fish can be stored on board that ship, or returned to the fishing ship where it will now occupy only one third of the room required by whole fish, or it can be pumped to a third ship whose function is to transport treated fish to shore distribution centers. On shore, the filleted and pasteurized fish may be kept in suspension and packaged in tins for delivery to stores where the suspending medium can be washed off and the fish displayed for sale.

Thus it can be seen that the present method of irradiation has great practical applicability to the processing of fish, however, it is also contemplated that additional foods such as dairy products, meats, wines, and grains be pasteurized or sterilized conveniently and economically. While the apparatus and process of the present invention has been described in terms of preferred embodiments, various modifications, alterations and adaptations are possible within the spirit and scope of the invention. For example, while the preferred embodiments have been concerned primarily with the treatment of raw bulk products, it is envisioned that the present apparatus and method are also applicable to packaged products. It is expected that still other modifications and variations will become apparent to those of ordinary skill in the art.

What is claimed is:
1. A process for the preservation of fish comprising the steps of;
  (a) eviscerating whole fish,
  (b) scaling the fish eviscerated in step (a),
  (c) filleting the fish scaled in step (b),
  (d) mixing the fish filleted in step (c) with a suspending media made from a solution of a member of the group consisting of starch, gelatin and agar to form a semisolid mixture,
  (e) passing the semisolid mixture formed in step (d) in a helical path around a cylindrical zone of radioactive source material such that said gel receives a dose of from about 75,000 to about 350,000 rads said helical path being divided into portions whereby the part of the mixture nearest the source during the first portion is furthest from the source during the second portion.

2. The method of claim 1 wherein said member of said group is agar.

3. The method of claim 1 wherein a first portion of said helical path is clockwise and a second portion of said helical path is counterclockwise.

4. The method of claim 3 wherein both of said portions are around the same source.

5. The method of claim 3 wherein said clockwise and counterclockwise portions are around separate sources.

References Cited

UNITED STATES PATENTS

| | | | |
|---|---|---|---|
| 2,968,734 | 1/1961 | Yeomans | 250—44 X |
| 3,142,759 | 7/1964 | Jefferson et al. | 250—52 X |
| 3,153,725 | 10/1964 | Attix | 250—44 X |

FOREIGN PATENTS 1,019,440   2/1966   Great Britain.

LIONEL M. SHAPIRO, *Primary Examiner.*

R. M. ELLIOTT, *Assistant Examiner.*

U.S. Cl. X.R.

99—158; 250—44, 48, 52